US009521221B2

(12) United States Patent
Huang et al.

(10) Patent No.: US 9,521,221 B2
(45) Date of Patent: Dec. 13, 2016

(54) TOUCH SCREEN COVER

(71) Applicant: AEVOE INTERNATIONAL LTD., Tortola (VG)

(72) Inventors: Cheng-Su Huang, Taipei (TW); Tzu-Ching Shao, Taipei (TW)

(73) Assignee: AEVOE INTERNATIONAL LTD., Tortola (VG)

( * ) Notice: Subject to any disclaimer, the term of this patent is extended or adjusted under 35 U.S.C. 154(b) by 0 days.

(21) Appl. No.: 14/614,674

(22) Filed: Feb. 5, 2015

(65) Prior Publication Data

US 2015/0156291 A1    Jun. 4, 2015

Related U.S. Application Data

(63) Continuation of application No. 14/105,092, filed on Dec. 12, 2013, now Pat. No. 9,112,956.

(30) Foreign Application Priority Data

Oct. 11, 2013    (TW) .............................. 102136815 A

(51) Int. Cl.
*H04M 1/02* (2006.01)
*H04B 1/3888* (2015.01)
(Continued)

(52) U.S. Cl.
CPC ............ *H04M 1/026* (2013.01); *G06F 1/1607* (2013.01); *G06F 1/1626* (2013.01); *G06F 3/044* (2013.01);
(Continued)

(58) Field of Classification Search
CPC ........ G06F 1/1637; G06F 3/041; G06F 3/002; G06F 3/03547; G06F 2203/04809; G06F 3/044; G06F 2203/04103; G06F 1/1643; G02B 27/027; G02B 27/025; H04M 1/22; H05K 3/067
See application file for complete search history.

(56) References Cited

U.S. PATENT DOCUMENTS 4,699,830 A *  10/1987  White ......................... 428/35.3
6,667,738 B2   12/2003  Murphy
(Continued)

FOREIGN PATENT DOCUMENTS

TW           523126 U      3/2003
TW           M437088 U     9/2012
(Continued)

OTHER PUBLICATIONS

YouTube, Flip leather case, Oct 8, 2013 https://www.youtube.com/watch?v=roK5YQvVYjY.*
(Continued)

*Primary Examiner* — Ping Hsieh
*Assistant Examiner* — James Yang
(74) *Attorney, Agent, or Firm* — Polsinelli PC

(57) ABSTRACT

A touch screen cover for a hand-held wireless communication device having a touch-sensing user interface and a telephone operational mode, in which, during an incoming call, a swipe-sensing user control zone of the user interface is activated together with a call-information display. The touch screen cover includes a protective panel, that in a shielding configuration, overlays a majority of the touch-sensing user interface of the hand-held wireless communication device. The protective panel has a touch-communicating portion that overlays at least part of the swipe-sensing user control zone of the user interface of the hand-held wireless communication device in the shielding configuration, the touch-communicating portion configured to receive a swiping touch engagement on an exposed outer surface thereof and responsively impart a sweeping capacitance-
(Continued)

induced user actuation of the swipe-sensing user control zone.

23 Claims, 13 Drawing Sheets

(51) Int. Cl.

| | | |
|---|---|---|
| *G06F 3/044* | (2006.01) | |
| *G06F 3/0488* | (2013.01) | |
| *H04M 1/725* | (2006.01) | |
| *G06F 1/16* | (2006.01) | |

(52) U.S. Cl.
CPC ......... *G06F 3/04883* (2013.01); *H04B 1/3888* (2013.01); *H04M 1/72519* (2013.01); *G06F 3/0488* (2013.01); *G06F 2200/1634* (2013.01); *G06F 2203/04107* (2013.01); *G06F 2203/04112* (2013.01); *G06F 2203/04808* (2013.01)

(56) References Cited

U.S. PATENT DOCUMENTS

| | | | | |
|---|---|---|---|---|
| 7,285,322 | B2* | 10/2007 | Kliesch et al. | 428/212 |
| 8,044,942 | B1 | 10/2011 | Leonhard et al. | |
| 2002/0114934 | A1 | 8/2002 | Liu et al. | |
| 2003/0087054 | A1 | 5/2003 | Janssen et al. | |
| 2004/0109096 | A1 | 6/2004 | Anderson et al. | |
| 2004/0112237 | A1* | 6/2004 | Chaug et al. | 101/483 |
| 2007/0036351 | A1* | 2/2007 | Yang | H04M 1/0202 379/433.13 |
| 2010/0017346 | A1* | 1/2010 | Extrand et al. | 705/400 |
| 2011/0006993 | A1* | 1/2011 | Longa | 345/169 |
| 2012/0050165 | A1* | 3/2012 | Kim et al. | 345/168 |
| 2012/0320501 | A1 | 12/2012 | Ackloo | |
| 2013/0076614 | A1* | 3/2013 | Ive et al. | 345/156 |
| 2013/0147221 | A1 | 6/2013 | Setina | |
| 2013/0181935 | A1* | 7/2013 | Mckenzie et al. | 345/174 |
| 2013/0242416 | A1 | 9/2013 | Feola et al. | |
| 2013/0307780 | A1* | 11/2013 | Todora et al. | 345/168 |

FOREIGN PATENT DOCUMENTS

| | | |
|---|---|---|
| TW | M460320 U | 8/2013 |
| WO | 2013025030 | 2/2013 |

OTHER PUBLICATIONS

Samsung, Samsung Galaxy Mega 5.8 spec, Apr. 2013 https://web.archive.org/web/20130430005439/http://www.gsmarena.com/samsung_galaxy_mega_5_8_i9150-5396.php.*
Ethan, How to Reject A Call, Apr. 2013 http://webcazine.com/5685/how-to-reject-a-call-by-sending-a-reject-call-message-on-samsung-galaxy-s3/.*
CMM, Micronit MEMS, Mar. 2013 http:/twww.cmmmagazine.com/mems/micronit-mems-to-showcase-through-glass-metal-via-technology-at-ssi/.*
Non-Final Office Action mailed Jan. 16, 2014; in corresponding U.S. Appl. No. 14/078,245.
Extended European Search Report mailed Feb. 24, 2015; in corresponding European patent application No. 14169699.7.
Taiwan Search Report; Taiwan Application No. 102136815; mailed Mar. 27, 2015.
English Translation of Taiwan Search Report; Taiwan Application No. 102136815; mailed Mar. 27, 2015.
English Computer Translation of TWM460320; Published on Aug. 21, 2013.
English Computer Translation of TW523126; Published on Mar. 1, 2003.
English Computer Translation of TWM437088; Published on Sep. 11, 2012.
Non-Final Office Action mailed Mar. 26, 2015; in corresponding U.S. Appl. No. 14/105,092.

* cited by examiner

TOUCH SCREEN COVER

CROSS-REFERENCE TO RELATED APPLICATION

The present application is a continuation of prior application Ser. No. 14/105,092, filed Dec. 12, 2013 which is hereby incorporated by reference in its entirety, which claims priority to Taiwanese application 102136815, filed Oct. 11, 2013, which is hereby incorporated by reference in its entirety.

FIELD

The present disclosure relates to a protective device for a portable mobile device. In particular, the disclosure relates to a protective device which enables users to impart touch-sensitive operations to one or more specific areas of a touch-sensitive user interface of a mobile device even when the portable mobile device is covered by the protective device. More particularly, the disclosure relates to a touch screen cover for a mobile device which overlays a touch-sensitive user interface, where a user can answer a call by swiping a touch communicating portion of the protective cover which correspondingly imparts sweeping capacitance-induced user actuation to a swipe sensing user control zone of the user interface.

BRIEF DESCRIPTION OF THE DRAWINGS

Implementations of the present application will now be described, by way of example only, with reference to the attached figures, wherein.

DETAILED DESCRIPTION

Figure 1A:
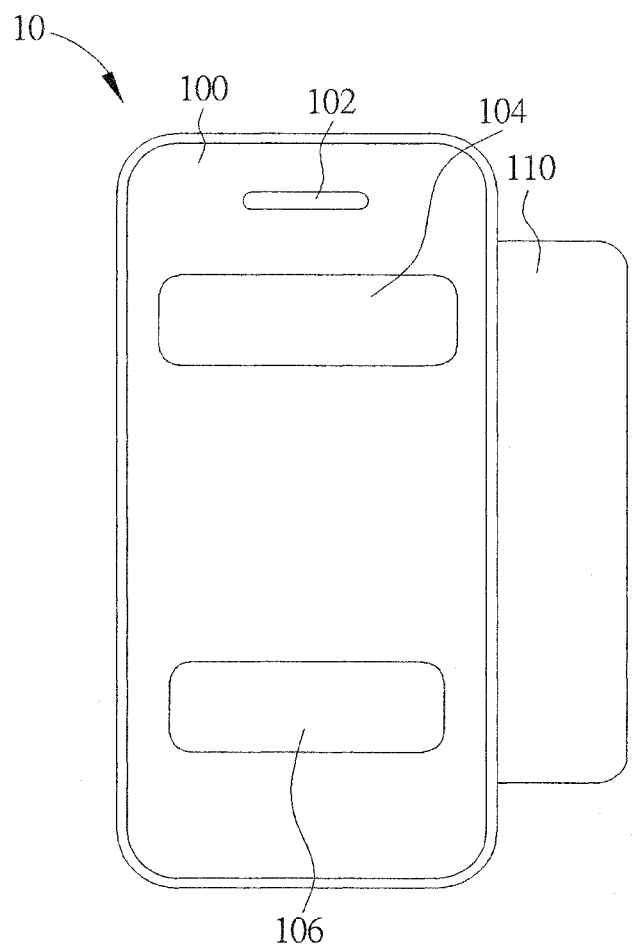
FIGS. 1A and 1B are exemplary schematic diagrams of the front and back of a touch screen cover.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, the embodiments described herein can be practiced without these specific details. In other instances, methods, procedures and components have not been described in detail so as not to obscure the related relevant function being described. Also, the description is not to be considered as limiting the scope of the implementations described herein.

It will be understood that descriptions and characterizations of embodiments set forth in this disclosure are not to be considered as mutually exclusive, unless otherwise noted.

Touch screens are widely used in variety of consumer electronics products such as iPhones, iPads, Droids, smart-phones, digital assistants (PDA), and other portable hand-held wireless mobile communication devices, and have the advantage of easy operation, fast response and are space-saving. These devices provide a multitude of functions including telephone operational modes, for placing and receiving calls, as well as texting, messaging, reminders, and other functions. Capacitive touch technology is one of the most popular touch technologies, having stable performance, good sensitivity and durability. It mainly makes use of capacitance changes generated by distortions in the electrostatic field caused by portions of the human body contacting the touch screen user interface, thereby registering touch and actuating functions in the device.

Additionally, along with the popularity of portable mobile devices, a variety of protective devices, such as covers, for portable mobile devices have also emerged consequentially to prevent the portable mobile devices from being scratched or damaged. However, a problem arises when the portable mobile device equipped with a touch-sensitive user interface is covered by a protective cover. Due to the thickness or other properties of the covers, detection of a user's touch-sensitive operation by capacitive induction is prevented resulting in inconvenience for the user. For example, when there is an incoming call, instead of merely touching or swiping the screen, a user must first open the protective device and then implement the functions of answering or rejecting calls by engaging the specific area of the capacitive touch screen user interface.

As a solution, disclosed herein are embodiments to enhance the convenience of the protective device so that the user can effectively operate a specific area of the touch-sensitive user interface even when the touch screen of the mobile device is covered. Accordingly, disclosed herein is a protective device which effectively protects the portable mobile device while at the same time permitting the user's touch-sensitive operation to be induced in a specific area of the user interface even when it is covered by the protective device.

Therefore, in embodiments disclosed herein is a touch screen cover for a hand-held wireless communication device having a touch-sensing user interface and a telephone operational mode, in which, during an incoming call, a swipe-sensing user control zone of the user interface is activated together with a call-information display. The touch screen cover can include a protective panel, that in a shielding configuration overlays a majority of the touch-sensing user interface of the hand-held wireless communication device. The protective panel can comprise a touch-communicating portion that overlays at least part of the swipe-sensing user control zone of the user interface of the hand-held wireless communication device in the shielding configuration. The touch-communicating portion can be configured to receive a swiping touch engagement on an exposed outer surface thereof and responsively impart a sweeping capacitance-induced user actuation of the swipe-sensing user control zone.

As noted above, in capacitive touch screens, touch sensitivity is achieved by measuring capacitance changes caused by a user's engagement with the screen. Accordingly, in order to operate the device, it can be advantageous that capacitive coupling is generated between the finger or fingers, fingertip or fingertips, capacitive stylus, or other suitable means, and the capacitive touch-sensitive screen. In some embodiments herein, there is provided a touch screen cover having a protective panel which covers and protects the touch screen, but at the same time changes properties in specific areas of the panel to enable capacitive induction of the user's touch sensitive operations on the user interface.

Figure 1B:
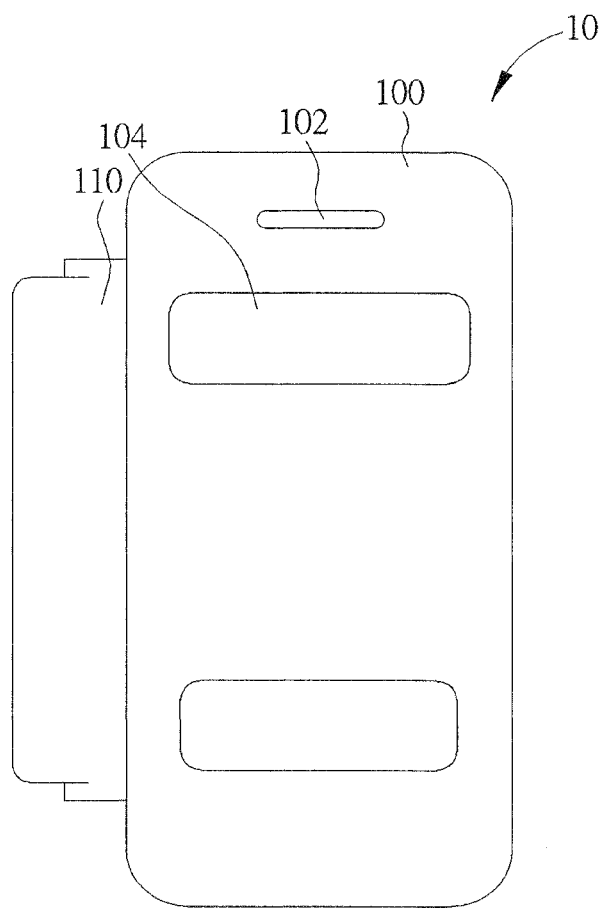

For more details, reference is made to embodiments shown in FIGS. 1A and 1B which illustrate a schematic diagram of the front and back portions of protective touch screen cover 10. Protective touch screen cover 10 can be used for the portable mobile device equipped with a capacitive touch-sensitive user interface, such as those found on portable media players, personal digital assistants and smart mobile devices, including iPhones, iPads, Droids as well as other devices. Such touch screens can be made from for example glass or a plastic film, such as polyethylene terephthalate (PET). The touch screen cover 10 can be applied to portable mobile devices. The touch screen cover can protect the device as well as maintain the touch-sensitive function of one or more specific areas of the capacitive touch-sensitive user interface of the device. Accordingly, the touch screen cover 10 can have a shielding configuration in which the touch-sensitive user interface is covered by protective panel 100. In the illustrated embodiment, the protective panel 100 fully overlays the user interface, except for audio output opening 102. However, in other embodiments the protective panel 100 can fully overlay the touch sensitive user interface; alternatively it can overlay at least a majority of the user interface, or alternatively overlay a minority of the user interface, or alternatively can least partially cover the user interface. Additionally, the touch screen cover 10 can be sized and shaped dimensionally to fit onto and cover an iPhone portable mobile device. In the illustrated embodiment, the protective panel 100 is substantially rectangular and has rounded corners to match those of the device. The touch cover can have any shape made to conform to the particular shape of a handheld device; however a substantially rectangular shape matches most of the current handheld devices. In the embodiment shown in FIGS. 1A and 1B, the touch screen cover 10 includes a protective panel 100 which covers the entire touch sensitive portion of the screen (excluding audio output opening 102) and has one flexible coupler 110.

The flexible coupler 110 can be pivotally connected to the portable mobile device by several ways, such as fastened on the portable mobile device by an adhesive, magnetic force, or by any other physical means. The flexible coupler 110 can be pivotally affixed to a protective shell, protective box or other shell, in which case the shell can be attached directly to the portable mobile device. For different attachment modes the flexible coupler 110 can be appropriately adjusted in size, shape and material. Protective panel 100 can be pivotally fixed to the portable mobile device by flexible coupler 110, which enables the protective panel 100 to flip back and forth between a shielding configuration to cover the capacitive touch-sensitive user interface to prevent the interface from being scratched or damaged, and a non-shielding configuration, in which the protective panel 100 does not cover the user interface and the user can directly touch and engage the user interface.

The protective panel can be made from a variety of materials. The protective panel can be flexible, semi-flexible, rigid and semi-rigid. Further, the protective panel can be made up of a plurality of layers, including a 3-layer conformation. For example, the three layers can include first a resilient outer surface, a second more rigid internal substrate layer, and a soft fibrous under surface. The layers can be co-molded or not co-molded. The resilient outer layer provides an exposed surface for touch or sweeping engagement by the user. In some embodiments, the protective panel can be formed from natural leather, synthetic leather, polyurethane (PU) leather, as well as a combination of such materials. Other alternatives to leather can be used, including plastics, vinyl, nylon, thermoplastic PU, polyvinyl chloride (PVC), or acrylic. The leather can form a protective outer surface layer while also providing a pleasant exposed outer surface for viewing and touching. In some embodiments, while having a leather outer surface, there can be contained within a second layer of a more rigid substrate material to help provide mechanical strength to the protective panel. For example, the inner substrate can be made up of a transparent plastic such as polyethylene terephthalate. The inner substrate can also be made up of other esters, acrylics, PVC, polyethylene or polypropylene or a mixture formed into film materials. A third layer can be placed on the underside of the protective panel facing the touch screen which is soft and non-abrasive to contact and protect the touch screen surface. This third fibrous layer can cover the entire undersurface, a majority or a minority. In some examples, the third layer can cover merely the peripheral edges, leaving the first and second layers covering the user interface or a substantial portion of the user interface. In some embodiments, the underside of the protective panel can include natural or synthetic fibrous lining. In one example, the underside can include a micro-fiber lining and can be made from a plastic such as PET. Other materials include soft natural or synthetic fibers, or cloths made from for example cotton, rayon, acetate, acrylic, or nylon.

Protective panel 100 includes a touch communicating portion 106, which can be arranged in the protective panel to overlay a specific location or zone on the touch-sensitive user interface, such as a location or zone where touch sensing is received for actuating a command, for example answering telephone call. For example, during an incoming telephone call, call-information may be displayed near the top of the user interface, while a swipe-sensing user control zone may be activated and located in an area near the bottom of the user interface. When these areas or zones are activated during a call, a user can answer the call by swiping the swipe-sensing user control zone which actuates the call answering function of the mobile device. The call-information may include a phone number, a name, or other identifying information. Alternatively, other functions may be conducted or displayed other than incoming phone call, including text message notification, updates or other messages.

As noted, many devices enable answering an incoming telephone call by swiping the user display with a finger in the lower area of the user interface. For example, to answer a call, unlock the phone, or show messages or notifications, a user can sweep across a swipe sensing zone or area of the user interface, for example by moving a finger or thumb from one side of the screen horizontally to the other side of the screen (left to right, or right to left). In other embodiments, this swiping motion can be a vertical (up or down) motion. In still other embodiments, no swiping may be necessary, but merely touching a certain portion of the touch screen. In order to alert the user where the swiping or touching engagement action should occur, a graphic might be supplied, such as a bar or arrow toward the lower portion of the user interface. Such areas or zones which register the user sweeping engagement to actuate a function can be referred to as the swipe-sensing user control zone of the touch-sensing user interface. Additionally, where touching actuates the function, this can be referred to as the touch-sensing user control zone. Such areas can be referred to generally as a sensing user control zone.

Referring again to FIGS. 1A and 1B, when protective panel 100 overlays the touch-sensitive user interface, for example in the shielding configuration, touch communication portion 106 can be positioned to overlay a majority, or alternatively, at least a portion of the swipe-sensing user control zone. The properties of touch communication portion 106 are such that user touch engagement with touch communication portion 106 still induces capacitance in the user interface, thus registering touch and sensing motion by the user interface in the area overlaid by the communication portion 106. In other words, the ability to induce capacitance and touch sensitive operations in the user interface is permitted or greater in the particular area of the touch communicating portion 106 as compared to other areas of the protective panel 100 outside of touch communicating portion 106 where capacitance or touch sensing will be reduced or not communicated through the panel to the user interface. Therefore, when the user touches, swipes or otherwise engages the exposed outer surface of protective panel 100 in the area of touch communicating portion 106, one can smoothly actuate any object or function based on the commands of the capacitive touch-sensitive user interface. Accordingly, sweeping or touching responsively imparts a touching or sweeping capacitance induced user actuation of the sweep or touch sensing user control zone.

Accordingly, the protective panel 100 has areas with different sensitivities. In particular, certain areas permit touch sensitive operations through the protective panel, and as a result, when the capacitive touch-sensitive user interface is covered by protective panel 100, the user is still be able to operate some functions of the portable mobile device through touch communicating portion 106.

Accordingly, in some embodiments, a majority of the protective panel 100 outside of the touch communicating portion 106 and window 102 will not induce capacitance in the user interface. In further embodiments, the substantial entirety of the protective panel besides the touch communicating portion 106 and window 102 will not induce capacitance in the user interface, whereas the majority or the substantial entirety of the touch communication portion 106 can induce capacitance in the user interface.

In order to achieve different sensitivities between the touch communicating portion 106 and the remainder of protective panel 100, different materials, properties or characteristics can be applied to the touch communicating portion 106, for example modifying thickness, conductivity and sheet resistance, etc. In the exemplary embodiment, the protective panel 100 can be made up of capacitance insulative material across its body including touch communicating portion 106. In order to be capacitance insulative (i.e. non-conductive), the sheet resistance of the material can be greater than or equal $10^{12}$ ($\Omega$/square). Further, in order to prevent capacitance inducement to the user interface, the thickness of the protective panel 100 other than the touch communicating portion 106 has a thickness of 1.5 mm or more. At this sheet resistance and thickness, a user's finger engagement with the surface of would not induce capacitance changes in the user interface beneath the touch cover.

However, in order to optimize touch performance, the thickness of touch communicating portion 106 has a lower thickness, in particular, between about 0.05 mm and 1.5 mm, or from 0.05 mm to less than 1.5 mm. Alternatively the thickness can be from 0.7 mm to 1.3 mm or alternatively from 0.7 mm to 1.1 mm or alternatively from 0.8 mm to 1 mm, or any combination of the aforementioned ranges. At such lower thickness, although having the same sheet resistance (i.e. greater than or equal $10^{12}$ ($\Omega$/square)) as the remaining areas of protective panel 100, touch communicating portion 106 will induce capacitance to user interface. The thickness can be less than 0.05 mm. The combination of the insulative sheet resistance value along with lower thickness causes the capacitance inducement in the user interface to be localized to the area around a user's finger or fingertip, etc. The sheet resistance value, as well as the thickness, can each be varied in order to maintain insulative properties, wherein capacitive induction is not produced in the user interface. Therefore, the touch communicating portion 106 induces capacitance in the user interface, whereas the remaining portions of the protective panel 100 will not induce capacitance upon engagement by the user on the outer surface. This differential registration of capacitance limits touch sensitivity and user actuation to only certain portions of the touch screen cover 10 and corresponding areas of capacitive touch-sensitive user interface 12 of the mobile device. Thus, sweeping by the user upon touch communicating portion 106 registers the same sweeping motion in the user interface in that particular corresponding area. Accordingly, if a function of the mobile device, such as call answering is achieved via sweeping, a user can provide sweeping capacitance actuation of such feature in the swipe-sensing user control zone of the user interface when the upon touch communicating portion 106 is overlaid thereon.

With respect to the above, while not limited to any particular theory, sheet resistance greater than or equal $10^{12}$ ($\Omega$/square) are capacitance insulative, i.e. non-conductive. However, at such a sheet resistance, whether capacitance is induced or registered in the user interface depends on the thickness of the material. When the thickness is 1.5 mm or more, no capacitance is induced in the user interface, however, when the thickness is between 0.05 mm and 1.5 mm, capacitance can be induced to the user interface by a user's engagement with the protective panel's surface. For example, the thickness can be 1.6 mm or more, alternatively 1.7 mm or more, alternatively 1.8 mm or more, alternatively 1.9 mm or more, or alternatively 2.0 or more. Accordingly, even if the protective panel is non-conductive, with a sufficiently small thickness, it can still register in the user interface, and localized to the area of the user's touch.

A sheet resistance less than $10^{12}$ ($\Omega$/square) is considered capacitance conductive for purposes of this disclosure. At such sheet resistances, a user's engagement would cause capacitance to register to the user interface, however it would not be localized. The conductivity would extend across the entire area or portion having such sheet resistance, however large, and would not be restricted to the particular localized engagement by a user's finger. In such cases, if the conductive area is too large, the user interface may not register or actuate because the entire portion of conductive area would receive capacitance rather than a particular area. Therefore, if such area having sheet resistance less than $10^{12}$ is too large, no sweeping motion would register to the device and fail to actuate a particular function. In other embodiments, material or layer with sheet resistance value ranging from $10^5$ ($\Omega$/square) to less than $10^{12}$ ($\Omega$/square) is considered as electric charge dissipation material or layer, whereas sheet resistance value less than $10^5$ ($\Omega$/square) is considered capacitance conductive. Both ranges however are "conductive" for purposes of this disclosure.

Returning again to FIGS. 1A and 1B, in touch screen cover 10 the protective panel 100 includes transparent window 104 which permits the user to obtain real-time display information on the user-interface, such as caller information, alarm, calendar, ringing, reminder and time. Accordingly, the transparent window 104 can overlay all, a majority, or at least a part of the call-information display. In some embodiments, the transparent window can be formed by omitting the outer resilient layer and the inner fibrous layer, to reveal only the second inner transparent substrate layer. For example, the transparent window 104 can be made up of a transparent panel made up of PET, plastic or glass. This way, a user can easily view information displayed on the user interface beneath the transparent window 104, including caller, time or other information. When the protective panel is comprised of three layers, in the particular area of transparent window 104, the outer leather layer, and inner fibrous layer can be removed, such that only the second layer made up of a transparent PET is present. Alternatively, the transparent window 104 can instead be merely a cut-out opening through the protective panel 100 exposing and making visible the call-information display.

Based on the corresponding caller information displayed in transparent window 104, the user is notified of events (i.e. incoming calls), and therefore can perform functions such as answering, holding or rejecting calls through touch communicating portion 106. In addition, protective panel 100 can also include audio output opening 102, which corresponds to the speaker position of the portable mobile device. Therefore, even though protective panel 100 covers the portable mobile device, the user is still able to easily use the call function of the portable mobile device. Based on the exemplary design, touch screen cover 10 includes audio output opening 102 and transparent window 104. The above embodiments are merely exemplary; the present disclosure is not limited to only these embodiments.

It should be noted that touch screen cover 10 is an exemplary embodiment. The touch communicating portion 106 can be transparent, allowing the user to clearly distinguish the generated by command. However, the touch communicating portion 106 can also be non-transparent, and further the shape and position of touch communicating portion 106 can be adjusted. Because the protective panel 100 overlays the user interface, a user may not be able to see graphics or other information during a call. Accordingly, the touch communication portion 106 can be colored differently or have different texture in order to alert the user of where touch or sweeping engagement should occur. In alternative embodiments, other areas of protective panel 100 can be transparent or opaque to demonstrate appearance of the portable mobile device, or personal features can be highlighted. The flexible coupler 110 can have a flexible feature which can be soft. Protective panel 100 and the flexible coupler 110 can be integrally formed, or alternatively, the flexible coupler 110 can be attached by adhesive or magnet, or other means. Users can view the information of capacitive touch-sensitive user interface 12 shown in transparent window 104 and implement the corresponding operation in touch communicating portion 106, so that location or shape of transparent window 104 or touch communicating portion 106 can be adjusted according to system requirements.

Figure 2A:
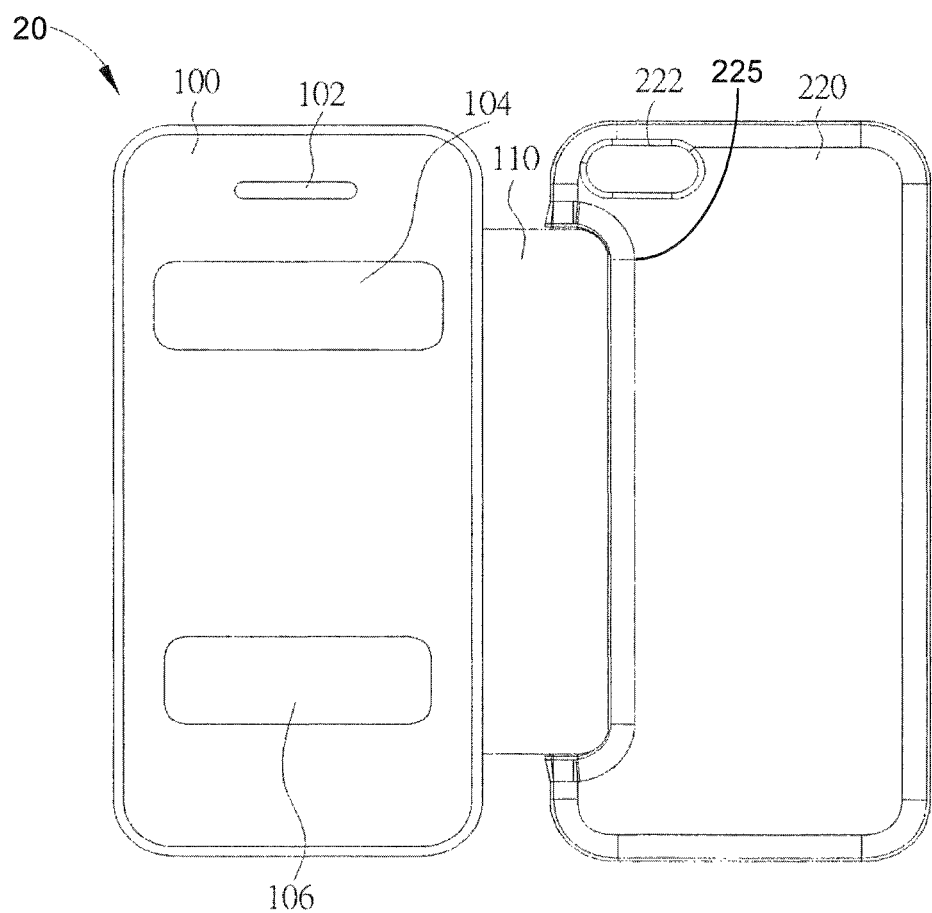
FIGS. 2A and 2B are exemplary schematic diagrams of the front and back of a touch screen cover.
Figure 2B:
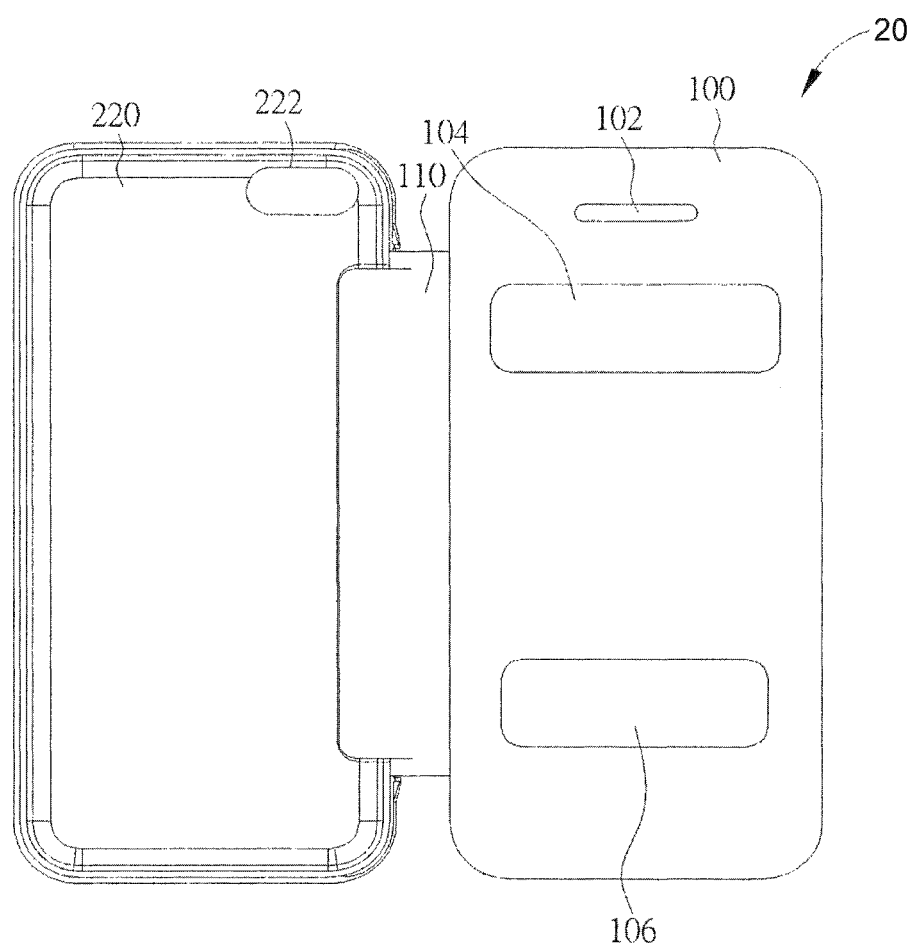
Figure 3A:
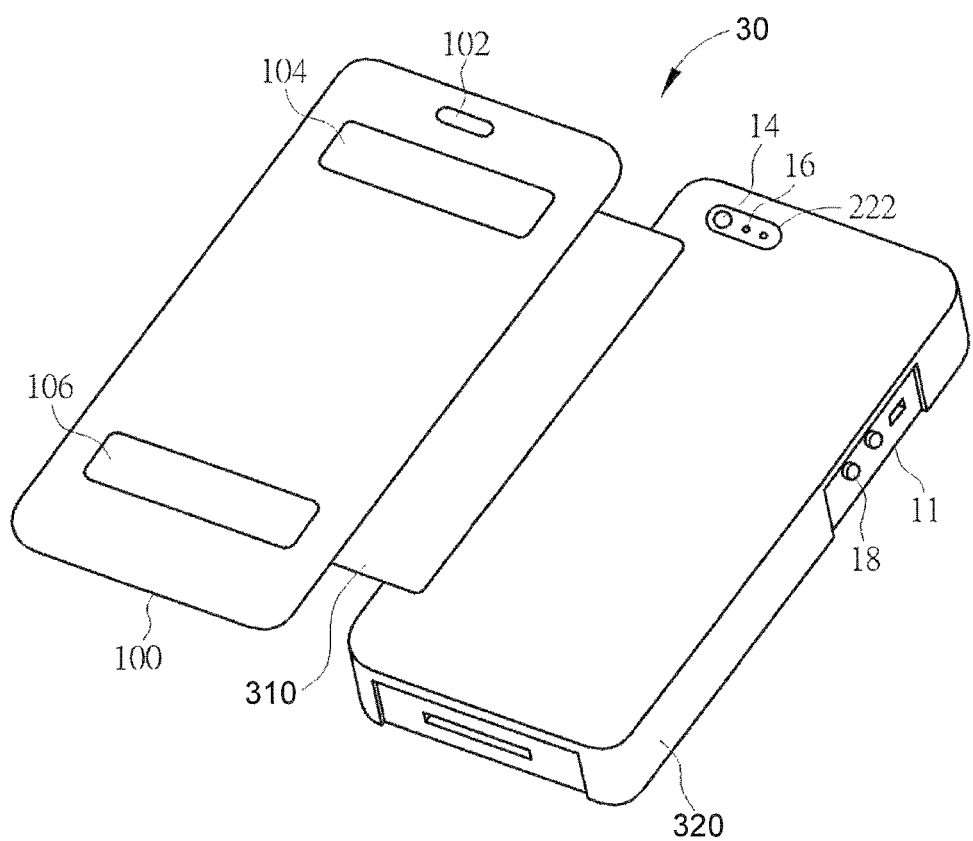
FIGS. 3A, 3B and 3C are exemplary schematic diagrams of a touch screen cover for a portable mobile device, protected by the protective panel of FIGS. 2A and 2B.
Figure 3B:
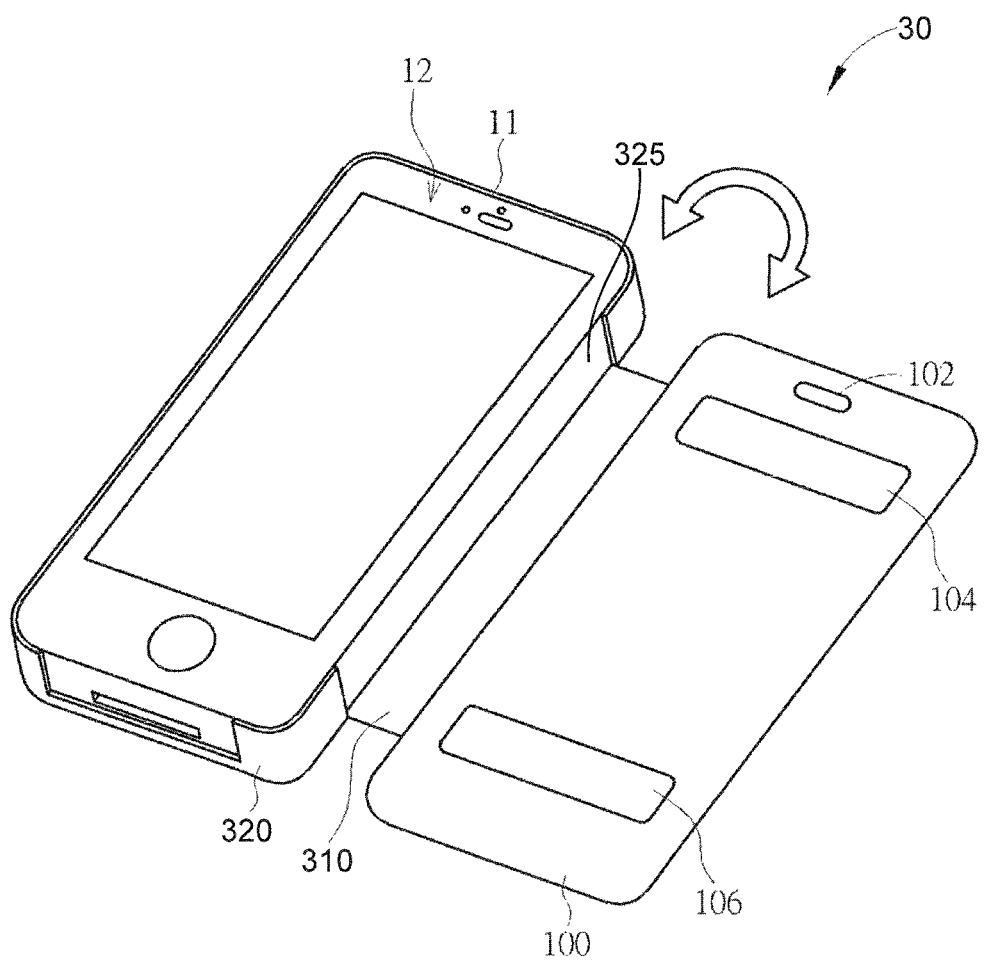
Figure 3C:
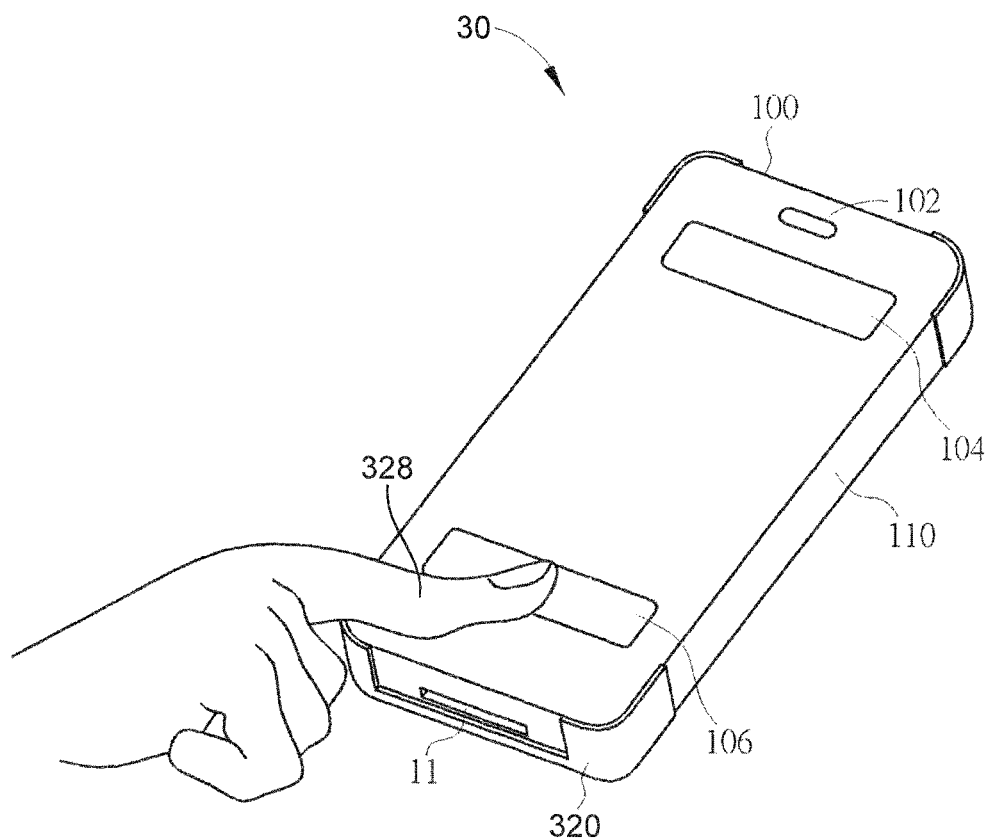

As mentioned above, flexible coupler 110 can be further pivotally fixed in the protective shell, protective housing, etc. and then the portable mobile device fixed in the housing, shown for example in FIGS. 2A, 2B, 3A, 3B and 3C. The device of FIGS. 2A and 2B differ from FIGS. 3A, 3B, and 3C in the structure of the housing and the manner in which the flexible coupler fixes the housing to the protective panel 100. FIGS. 2A and 2B illustrate, respectively, the exemplary front and back schematic diagram of the touch screen cover 20. FIGS. 3A, 3B and 3C illustrate a schematic diagram touch screen cover 30 of the portable mobile device 11. Touch screen cover 20 illustrated in FIGS. 2A and 2B is similar to the touch screen cover 10 in FIG. 1; however the flexible coupler 110 in the touch screen cover 20 is fixed in housing 220, and then attached to the portable mobile device 11 during installation. The flexible coupler 110 can attach to an indented portion 225 of the housing 220. The indented portion 225 can be shaped according to the flexible coupler 110 for receiving therein. The ends of the indented portion can include pivotation protrusions into the flexible coupler 110 to facilitate swinging. In detail, housing 220 can partially wrap the portable mobile device 11 and include and protect portable mobile device 11 therein, which prevents the portable mobile device 11 from being scratched or damaged. Housing 220 can have a hard scratch-resistant surface or equipped with a shock-proof resistance structure, and can be made for example of polycarbonate or other materials. Housing 220 includes opening 222, which corresponds to portable mobile device 11, camera lens 14, flashlight 16 as well as other components typically found on a mobile device. Placement of opening 222 within the housing 220, and placement of other such openings, can depend on the location of components on the device 11 to be protected. In some embodiments, the housing 220 does not cover any function keys of portable mobile device 11, such as, for example, volume key 18. Housing 220 can be transparent or opaque to enhance the appearance of portable mobile device 11.

Furthermore, as described in FIGS. 3A and 3B regarding touch screen cover 30, protective panel 100 is attached to the portable mobile device 11 via flexible coupler 310 pivotally fixed in housing 320, which can be flipped back and forth between a shielding and non-shielding configuration to correspondingly cover or uncover capacitive touch-sensitive user interface 12 of portable mobile device 11. The housing 320 has aperture 325 in a side thereof which receives the flexible coupler 110 when flipped to the shielding configuration. When capacitive touch-sensitive user interface 12 is covered by protective panel 100, then by using the characteristics of touch communicating portion 106, the user is still able to operate some functions of portable mobile device 11, which are illustrated in FIG. 3C. For example, FIG. 3C illustrates a finger 328 swiping across touch communicating portion 106.

Figure 4:
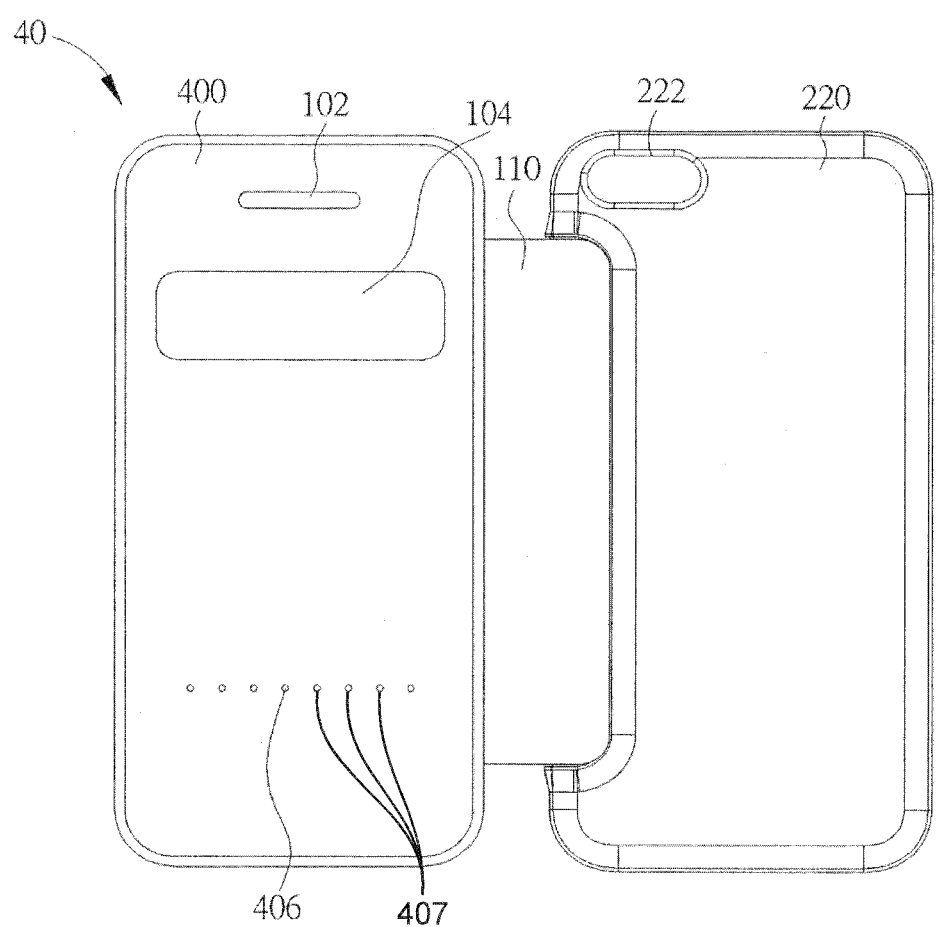
FIG. 4 is an exemplary schematic diagram of a touch screen cover.

Referring now to FIG. 4, there is illustrated an exemplary schematic diagram of touch screen cover 40. The structure of touch screen cover 40 is similar to touch screen cover 20 in FIGS. 2A and 2B, however one difference being protective panel 400 of touch screen cover 40 includes a touch communicating portion 406 having markings 407 made up of a plurality of circular designations or dots. Accordingly, when cover panel 400 covers the capacitive touch-sensitive user interface 12, the user's fingers can swipe across or touch the touch communicating portion 406, and induce capacitance in user interface 12. The markings can be colored markings such as blue, red, or purple, or some color which catches the eye and distinguishes itself on the protective panel 400. Alternatively, the markings can be punched holes or openings. Such markings are provided over user control zones of the touch-sensitive user interface, so as to provide a visual cue to a user indicative of where such user control zones are located. Accordingly, a user could see such markings and touchingly engage the markings area in a sweeping motion, induce capacitance in the user control zone and thus actuate the answering of a telephone call. Therefore a user can easily locate where to provide touch engagement during use by viewing the markings. In the embodiment shown in FIG. 4, the circular markings are provided in a linear fashion over a lower portion of the protective panel 400 where, for example, on an iPhone, a sweeping motion would cause answering of an incoming telephone call.

In the illustrated embodiment of FIG. 4, the circular markings are provided in a linear series, however these markings can be arranged to form other shapes such as circles, squares, or rectangles, or other polygons, or can form crosses, a crisscross or diagonal shapes, or placed in other locations on protective panel 100 depending on the mobile device's user touch functionalities. Accordingly, different touch-sensitive functions, such as answering, holding or rejecting calls may be induced on capacitive touch-sensitive user interface 12, by a user swiping the touch communicating portion 406. Therefore, in addition to providing appearance change, the circular touch-sensitive area 406 of touch screen cover 40 enable the user to implement different touch-sensitive operations based on different commands displayed or permitted on the capacitive touch-sensitive panel 12.

In some embodiments, the protective panel 400 covering the user interface is touch communicating across all or a majority of the user interface of a mobile device, including portions outside touch communicating portion 406 as well as portions inside touch communicating portion 406. In such case, the protective panel 400 sheet resistance can be greater than or equal $10^{12}$ ($\Omega$/square) and has a thickness of between 0.5 and 1.5 mm in thickness. In such case, a user's touch anywhere on the surface of the protective panel having such sheet resistance and thickness would communicate to the user interface of the mobile device. In such an embodiment the markings of the touch communicating portion 406 shown in FIG. 4 would serve merely to alert the user of where on the touch cover to touch or sweep to conduct particular functions, such as answering, holding or rejecting calls, or other functions. In other embodiments, the portions of the protective panel 400 outside of the touch communicating portion 406 would have a thickness of 1.5 mm or more and a sheet resistance greater than or equal $10^{12}$ ($\Omega$/square) such that it is insulative rather than conductive to the touch-sensitive user interface, while at the same time touch communicating portion 406 would have a thickness between 0.5 and 1.5 mm in thickness and thus permit localized capacitance induction.

When protective panel 400 covers the capacitive touch-sensitive user interface 12, the user's fingers can swipe across touch communicating portion 406, or touch areas of the touch communicating portion 406. In so doing, different touch-sensitive functions, such as answering, holding or rejecting calls may be induced on capacitive touch-sensitive user interface 12. Accordingly, in addition to providing appearance change, the markings in touch communicating portion 406 of touch screen cover 40 enables the user to implement different touch-sensitive operations based on different commands displayed or permitted on the capacitive touch-sensitive user interface 12.

Figure 5:
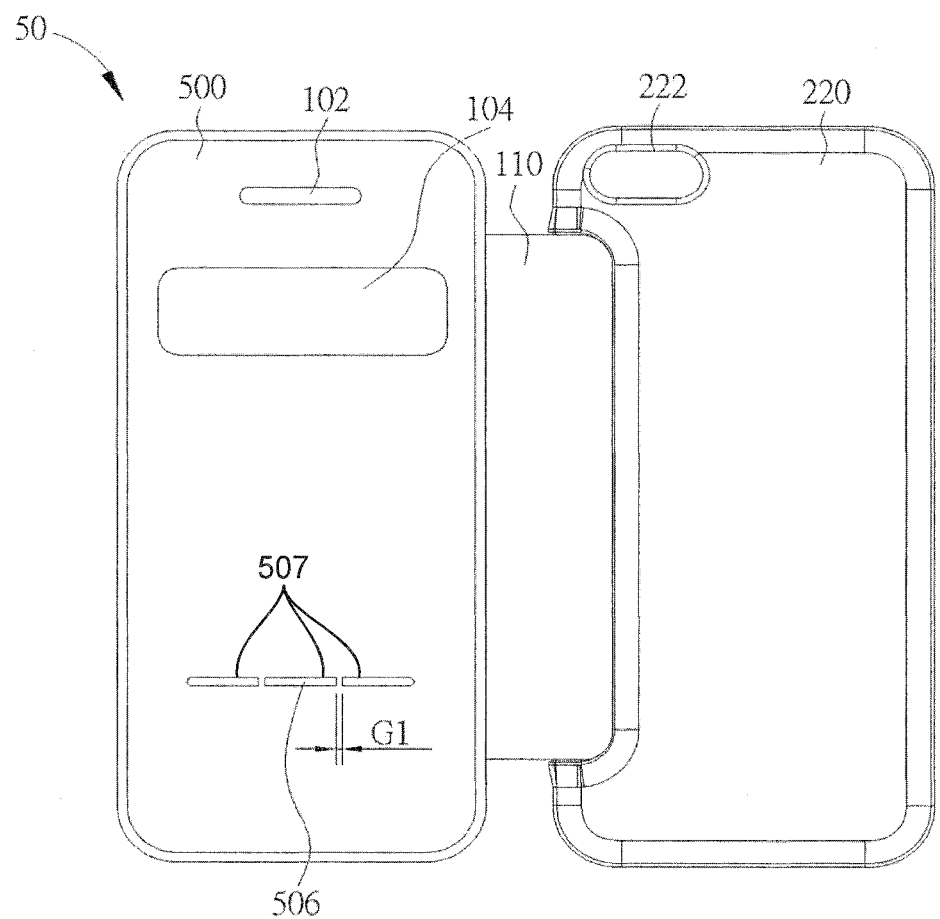
FIG. 5 is an exemplary schematic diagram of a touch screen cover.

Referring now to FIG. 5, there is illustrated an exemplary schematic diagram of touch screen cover 50. The structure of touch screen cover 50 is the same as the touch screen cover 20 except that protective panel 500 of touch screen cover 50 includes touch communicating portion 506. The touch communicating portion 506 is made of a series of capacitance conductive portions 507 with a distance G1 between two adjacent capacitance conductive portions. As a result, when the user's finger swipes or touches and forms a particular conductive path with the specific touch communicating portion 506, and in particular the capacitance conductive portions 507, the capacitive touch-sensitive user interface 12 detects the location of the finger applied on touch communicating portion 506.

In contrast, the protective panel 500 has areas higher in impedance outside of touch communicating portion 506, which do not register the user's finger for implementing touch-sensitive operations on the capacitive touch-sensitive user interface 12. Such areas outside of touch communicating portion 506 are capacitance insulative, for example having a sheet resistance greater than or equal $10^{12}$ ($\Omega$/square), as well as a thickness greater than 1.5 mm. Accordingly, at this sheet resistance and thickness, the capacitive touch-sensitive user interface 12 does not detect whether a finger touches outside the conductive touch communicating portion 506. In other words, since the conductive portions of touch communicating portion 506 have good conductivity, the sensitivity of the capacitive touch-sensitive user interface 12 operated by the touch communicating portion 506 are higher than the remaining portions of the protective panel 500.

In one example the sheet resistance for each of the capacitance conductive portions of the touch communicating portion 506 is less than $10^{12}$ ($\Omega$/square). The conductive portions are not limited to these values, but should have low enough sheet resistance so as to be capacitance conductive. The material between adjacent pairs of capacitance conductive portions made up of capacitance insulative material. Additionally, in some embodiments, the touch communication portion 506 is made up of a series of alternating capacitance conductive portions and capacitance insulative portions. It is noted that the size and distance G1 between each of the of the capacitance conductive portions of the conductive touch communicating portion 506 should be sufficient such that the capacitive touch-sensitive user interface 12 is not hindered in determining and reading touch points when a user swipes across multiple capacitance conductive portions.

Because each of the capacitance conductive portions has a sheet resistance less than $10^{12}$ ($\Omega$/square) and is conductive, capacitance is transmitted across the entire area of each individual conductive portion. Accordingly, if a capacitance conductive portion has too large an area, the user interface will not register a particular localized area and thus may not actuate. Accordingly, the conductive portions should be sized to transmit a small enough area for registering a localized area. By spacing several in a linear fashion, as a user touches each portion in succession during a swipe, each will "light" up or conduct across its area as the sweep proceeds. Thus, the user interface will register each conductive portion in succession during the finger swipe by the user, and thus will mimic a sweep similar to the user's finger itself. Because of this property, the capacitance conductive portions 507 can each be partially overlain by capacitance insulative portions of the protective panel. Alternatively, the overlain capacitance insulative portions can have a plurality of capacitance conductive zones that permit capacitance communication from the exposed outer surface. Alternatively, cutout windows in the capacitance insulative portions can be made to provide openings to the capacitance conductive portions. Alternatively, a component of the capacitance conductive portions can extend through overlain capacitance insulative portion from the exposed outer surface. Accordingly, if a user's finger touches any portion of the exposed capacitance conductive portions or overlain zones, the conductivity will transmit across its entire area to the user interface. This way the capacitance conductive portions can each be at least partially covered in the protective panel by leather or PU leather or other material and provide a more aesthetic surface covering to the user.

In the embodiment shown in FIG. 5 there are shown three capacitance conductive portions, however there can be a plurality of capacitance conductive portions, including any number from 2 or more, alternatively 2 to 10, alternatively 2 to 5, alternatively 2 to 6, or alternatively 3 to 5 panels, or a combination thereof. The number of capacitance conductive portions can depend on the capability of the mobile handset. Further, the length or height in one direction of each capacitance conductive portion is not limited, but can be from 0.1 mm to 20 mm, alternatively 1 mm to 18 mm, alternatively 2 mm to 15 mm, alternatively 3 mm to 12 mm, alternatively 2 mm to 7 mm, alternatively 2 mm to 5 mm, or a combination of the former. Further, although not limiting, the size can be for example, 0.5 cm×0.5 cm, or alternatively 1 cm×1 cm, or alternatively, 1.5 cm×1.5 cm, or alternatively 2 cm×2 cm, or alternatively, 5 cm×5 cm or a combination of the former.

Further to the above, the distance G1 should not be so large such that the interface fails to register a successive sweep, but should not be so small such that the user interface does not read adjacent conductive portions as a collective unit, (rather than multiple units). For example, the distance G1 between two adjacent capacitance conductive portions of conductive touch communicating portion 506 is not limited, but can range from 0.1 mm to 15 mm, alternatively 1 mm to 14 mm, alternatively 2 mm to 13 mm, alternatively 4 mm to 12 mm, alternatively 6 mm to 11 mm, alternatively 7 mm to 10 mm, or a combination of the aforementioned ranges. Alternatively, the distance G1 can be at least 0.1 mm or no more than 15 mm.

In addition, each of the capacitance conductive portions of touch communicating portion 506 are substantially rectangular in the illustrated embodiment, but the shape is not limited, but can take other forms such as circular, square, pentagon, hexagon, or other polygons, and can be regular and irregular polygons. Moreover, in the illustrated embodiment, the capacitance conductive portions are linearly arranged, but can be arranged in other forms such as crosses, crisscross or diagonal shapes, or placed in other locations over the user interface.

Accordingly, in some embodiments, a majority of the protective panel 500 outside of the touch communicating portion 506 and window are capacitance insulative. In further embodiments, the substantial entirety of the protective panel 500 outside of the touch communicating portion 506 and window are capacitance insulative.

Figure 6:
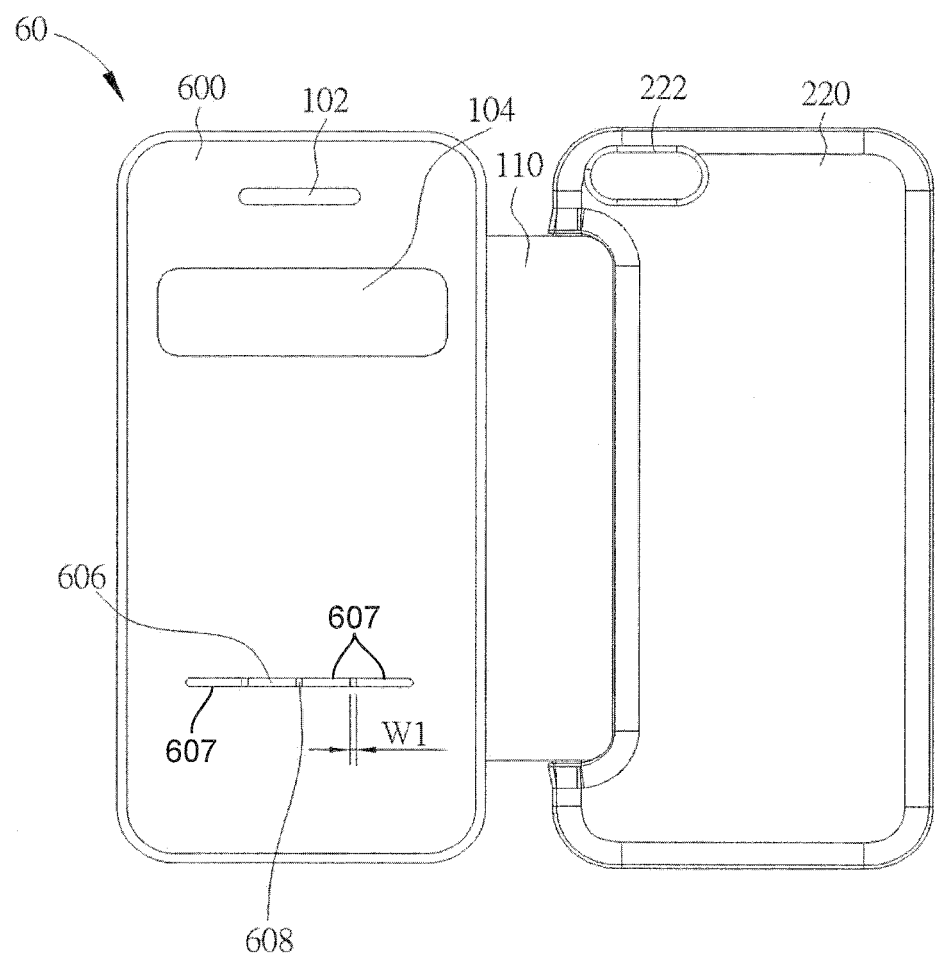
FIG. 6 is an exemplary schematic diagram of a touch screen cover.

Referring now to FIG. 6, there is illustrated an exemplary schematic diagram of touch screen cover 60. The structure of touch screen cover 60 is the same as touch screen cover 50 except that protective panel 600 of touch screen cover 60 includes touch communicating portion 606. The touch communicating portion 606 is made of a series of capacitance conductive portions 607 with transparent window intervals 608. The transparent window intervals 608 are set between two adjacent capacitance conductive portions 607 of touch communicating portion 606. The transparent window intervals 608 have a width of W1, with a distance G1 between the capacitance conductive portions 607. The width W1 can be equivalent to the distance G1, discussed above, between two adjacent capacitance conductive portions. As a result, when the user's finger touches and forms a particular conductive path with the specific touch communicating portion 606, and in particular the capacitance conductive portions, the capacitive touch-sensitive user interface 12 detects the location of the contact finger applied on touch communicating portion 606, and the capacitance value of the location to changes, which enables the capacitive touch-sensitive user interface 12 to send a corresponding touch-sensitive signal to the user-interface. The window intervals 608 can be made up of PET or glass or other transparent material, and can be revealed portions of the inner substrate layer, or can be openings through the protective panel.

Although four capacitance conductive portions are shown in the illustrative embodiment of FIG. 6, there can be can be any number from 2 or more, alternatively 2 to 10, alternatively 2 to 5, alternatively 2 to 6, or alternatively 3 to 5 panels, or a combination of the aforementioned.

In one example the sheet resistance for each capacitance conductive portion 607 of the touch communicating portion 606 is less than $10^{12}$ (Ω/square). Transparent window intervals 608 are made of a transparent material so that when the capacitive touch-sensitive user interface is covered by protective panel 600, users obtain information displayed on the capacitive touch-sensitive panel in real-time through the transparent window intervals 608 of protective panel 600. Also, it is noted that the size and distance of width W1 of the transparent window intervals 608 between each of the of the capacitance conductive portions of the conductive touch communicating portion 606 should be sufficient such that the capacitive touch-sensitive user interface 12 is not hindered in determining and reading touch points when a user swipes across multiple capacitance conductive portions. The ranges as discussed above with respect to G1 can be the same for windows W1.

Figure 7:
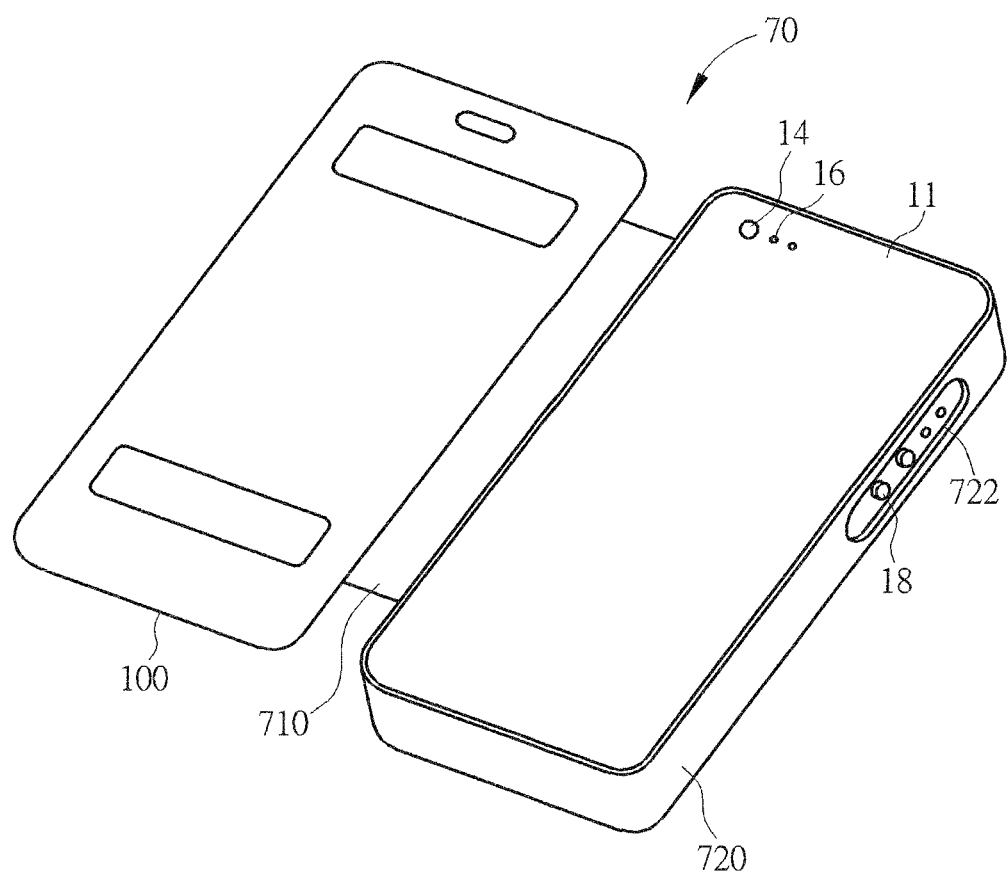
FIG. 7 is an exemplary schematic diagram of a touch screen cover.

In addition, the housing can be adjusted to include and protect the portable mobile device. Referring now to FIG. 7, there is illustrated an exemplary schematic diagram of touch screen cover 70. The structure of touch screen cover 70 is the same as touch screen cover 20 in FIGS. 2A and 2B except that housing 720 of touch screen cover 70 is formed into a rectangular-shaped ring frame structure, which surrounds and covers the sides of the portable mobile device 11. Housing 720 includes keys opening 722, which corresponds to the function keys of portable mobile device 11, such as volume key 18. In addition, the flexible coupler 710 of touch screen cover 70 is attached to housing 720, namely fixed to the side of portable mobile device 11, which permits protective panel 100 of touch screen cover 70 to flip back and forth and cover the capacitive touch-sensitive user interface 12. As mentioned above, when the capacitive touch-sensitive user interface 12 is covered by protective panel 100, by using the characteristics of communicating portion 106, the user is still be able to operate some functions of portable mobile device 11 through touch-sensitive area 106.

Figure 8:
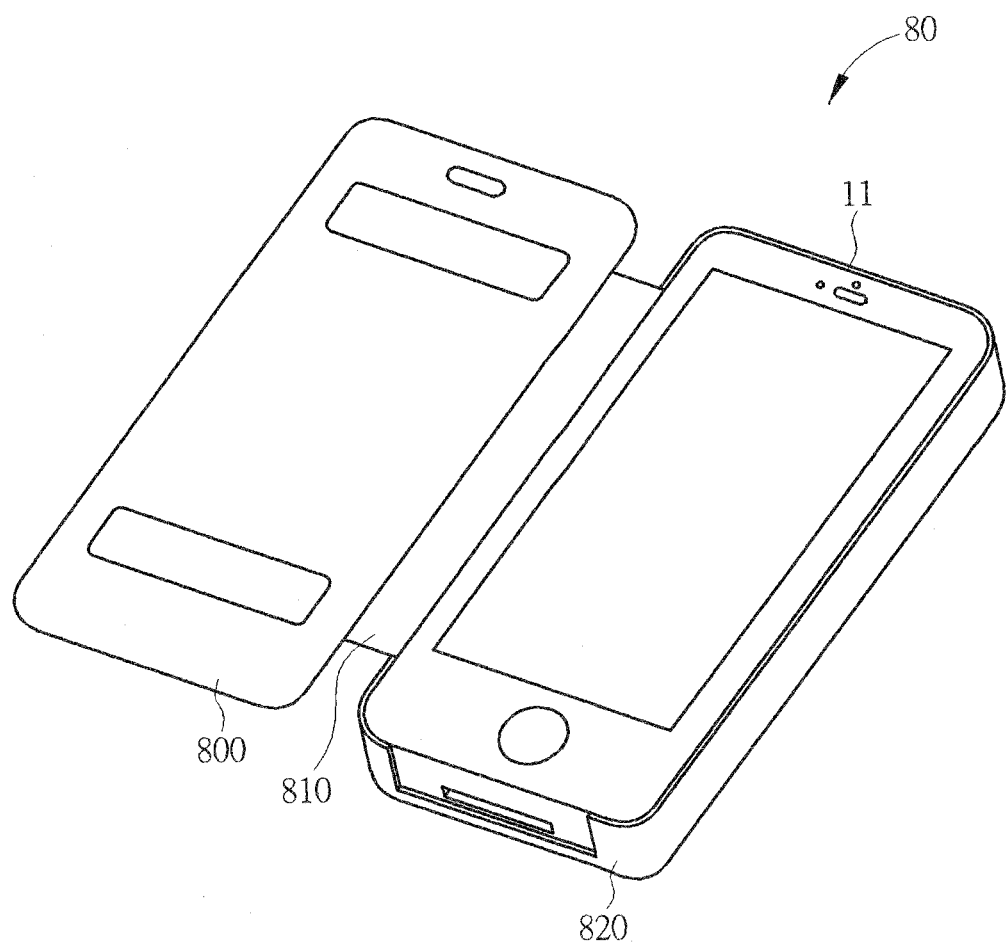
FIG. 8 is an exemplary schematic diagram of a touch screen cover.

Referring now to FIG. 8, there is illustrated an exemplary schematic diagram of touch screen cover 80. Touch screen cover 80 includes a protective panel 800, a flexible coupler 810 and a housing 820, and its architecture can be substantially the same as the structure of touch screen cover 20 in FIGS. 2A and 2B. The difference is that, compared with FIG. 2B, flexible coupler 110 and housing 220 are attached to the left side of protective panel 100; in touch screen cover 80 flexible coupler 810 and housing 820 are attached to the right side of protective panel 800, thus enabling left-handed users to open the protective panel 800 with the left hand, and real-time operation of portable mobile device 11 can be achieved.

Figure 9:
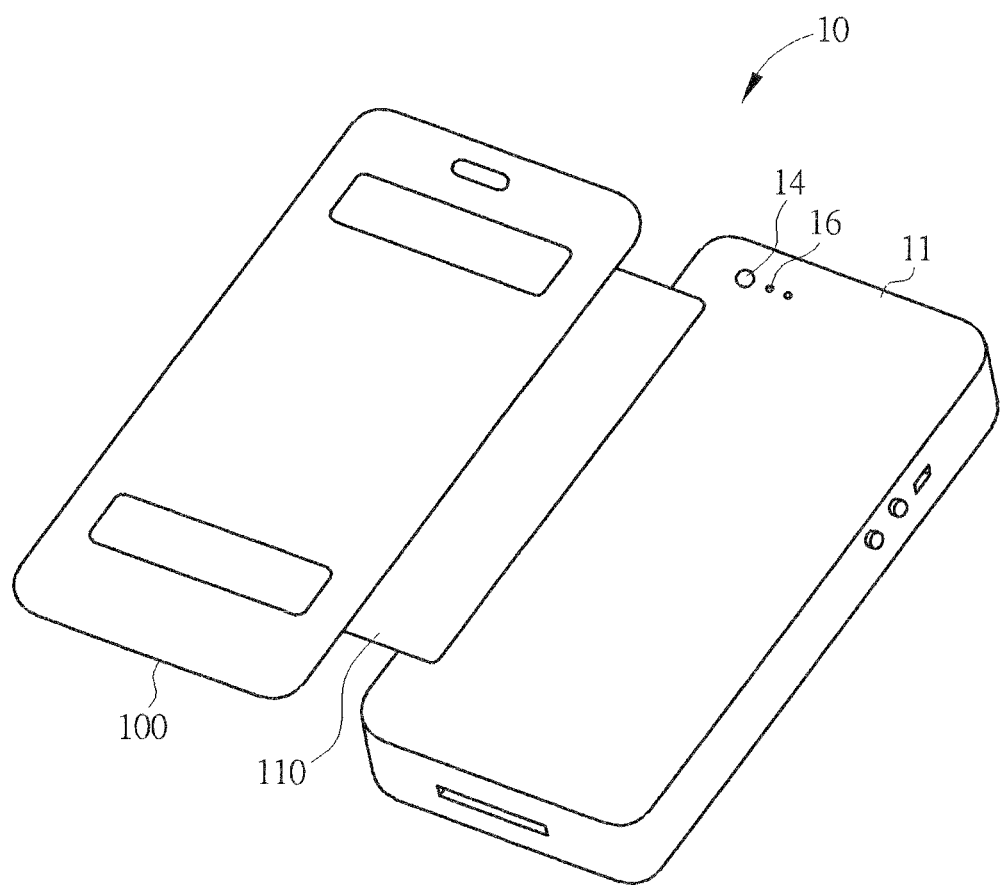
FIG. 9 is an exemplary schematic diagram of a touch screen cover.

Above touch screen covers 20, 30, 40, 50, 60, 70 and 80 include a protective shell. For such devices, the flexible coupler can be attached to the protective shell through adhesives, magnetic coupling, or made integral with the shell. FIG. 9 illustrates the touch screen cover 10 fixed directly to the portable mobile device 11. In this case flexible coupler 110 can be attached to portable mobile device 11 through a variety of methods, and for different attachment methods flexible coupler 110 can be adjusted in size, shape and material. For example, flexible coupler 110 can be attached to the surface of portable mobile device 11 by adhesive material, or magnetically attached to portable mobile device 11. Protective panel 100 can be fixed to portable mobile device 11 through flexible coupler 110 and can flip back and forth to cover the capacitive touch-sensitive user interface 12 of portable mobile device 11 to prevent the capacitive touch-sensitive user interface 12 being scratched or damaged. As mentioned before, when capacitive touch-sensitive user interface 12 is covered by protective panel 100, by using the characteristics of touch communicating portion 106, the user is still be able to operate some functions of portable mobile device 11 through touch communicating portion 106.

In the past, when a protective device covered the capacitive touch-sensitive user interface, a user was not able to access the user interface and consequently was not able to actuate any functions, causing inconvenience to the user. In contrast, in the present disclosure, when a touch screen cover overlays the capacitive touch-sensitive user interface, the user is still able to operate some functions of the portable mobile device by use of the touch communicating portion. Therefore, with an incoming call, the user can perform functions such as answering, holding or rejecting the call without opening the protective device, and convenience is effectively enhanced.

In summary, the touch screen cover disclosed herein effectively protects a portable mobile device, and when covered by a capacitive touch-sensitive panel, it permits touch-sensitive operations by the user through the touch-sensitive area of the touch screen cover thereby improving convenience.

The various embodiments described above are provided by way of illustration only and should not be construed to limit the scope of the disclosure. Various modifications and changes can be made to the principles and embodiments described herein without departing from the scope of the disclosure and without departing from the claims which follow.

DESCRIPTION OF SYMBOLS

10, 20, 30, 40, 50, 60, 70, 80 Touch screen cover
11 Portable mobile device
12 Capacitive touch-sensitive user interface
14 Camera lens
16 Flashlight
18 Volume key
100, 400, 500, 600, 800 Protective panel
102, 222 Audio output opening, opening
104 Transparent window
106, 406, 506, 606 Touch communicating portion
110, 310, 710, 810 Flexible coupler
220, 320, 720, 820 Housing
225 Indented Portion
325 Aperture
328 Finger
407, 507, 607 Capacitance conductive portions
608 Transparent window intervals
722 Keys opening
G1 Distance
W1 Width

What is claimed is:

1. A touch screen cover for a hand-held wireless communication device having a touch-sensing user interface and a telephone operational mode, in which, during an incoming call, a swipe-sensing user control zone of the user interface is activated together with a call-information display, the touch screen cover comprising:
    a protective panel, that in a shielding configuration overlays a majority of the touch-sensing user interface of the hand-held wireless communication device, the protective panel having a capacitance insulative portion that does not induce capacitance in the user interface when touched by a user, and a window that overlays at least part of the call-information display,
    the protective panel comprises a touch-communicating portion that overlays at least part of the swipe-sensing user control zone of the user interface of the hand-held wireless communication device in the shielding configuration, the touch-communicating portion configured to receive a swiping touch engagement on an exposed outer surface thereof and responsively impart a sweeping capacitance-induced user actuation of the swipe-sensing user control zone,
    wherein the touch-communicating portion comprises a series of capacitance conductive portions each separated a distance one from the other, wherein the series of capacitance conductive portions are each separated from one another by a portion comprising a transparent window interval, and wherein the series of capacitance conductive portions are linearly arranged, and
    wherein only the transparent window interval of the touch-communicating portion is transparent.

2. The touch screen cover according to claim 1, wherein the each of the series of capacitance conductive portions have a sheet resistance such that conductivity is not localized but conducts capacitance across the entire conductive portion upon engagement by a user with any portion thereof.

3. The touch screen cover according to claim 1, wherein the sheet resistance of each of the series of capacitance conductive portions is less than $10^{12}$ ohms per square.

4. The touch screen cover according to claim 1, wherein the sheet resistance of each of the series of capacitance conductive portions is less than $10^5$ ohms per square.

5. The touch screen cover according to claim 1, wherein the sheet resistance of the capacitance insulative portion is greater than or equal to $10^{12}$ ohms per square.

6. The touch screen cover according to claim 1, wherein the capacitance insulative portion is comprised of at least one of natural leather, synthetic leather, polyurethane, or a mixture thereof.

7. The touch screen cover according to claim 1, wherein the window is a transparent window comprising polyethylene terephthalate (PET).

8. The touch screen cover according to claim 1, wherein the window is a transparent window comprising glass.

9. The touch screen cover according to claim 1, wherein the window that overlays at least part of the call-information display is a cut-out through the touch screen cover exposing the call-information display.

10. The touch screen cover according to claim 1, wherein the series of capacitance conductive portions are each separated from one another by capacitance insulative portions that do not induce capacitance in the user interface when touched by a user.

11. The touch screen cover according to claim 1, wherein the series of capacitance conductive portions are each separated from one another by portions which register only localized capacitance at the particular localized area of engagement by the user's finger.

12. The touch screen cover recited in claim 1, wherein the series of capacitance conductive portions are each spaced apart from one another by from 0.1 to 15 millimeters.

13. The touch screen cover recited in claim 1, wherein a substantial entirety of the protective panel besides the touch-communicating portion and window is capacitance insulative.

14. The touch screen cover recited in claim 1, wherein a majority of the protective panel is capacitance insulative that does not induce capacitance in the user interface when touched by a user.

15. The touch screen cover recited in claim 1, further comprising a coupler that pivotally connects the touch screen cover to the hand-held wireless communication device.

16. The touch screen cover recited in claim 1, further comprising a flexible coupler that connects the touch screen to the hand-held wireless communication device thereby permitting the touch screen cover to swing between the shielding configuration and an open configuration.

17. The touch screen cover recited in claim 1, wherein the each of capacitance conductive portions are at least partially overlain by a capacitance insulative portion.

18. The touch screen cover recited in claim 17, wherein each one of the series of capacitance conductive zones comprises a cutout window through the overlain capacitance insulative portion and through which the capacitance conductive portion is exposed for touch-contact therewith.

19. The touch screen cover recited in claim 1, wherein the capacitance insulative portion is 1.5 mm or more.

20. The touch screen cover recited in claim 1, wherein the series of capacitance conductive portions comprises from 3 to 6 capacitance conductive portions.

21. The touch screen cover recited in claim 1, wherein the underside of the protect panel includes a micro-fiber lining.

22. The touch screen cover recited in claim 1, wherein the transparent window interval is made up of polyethylene terephthalate (PET).

23. The touch screen cover recited in claim 1, wherein the transparent window interval is made up of glass.

* * * * *